J. O. SNYDER.
AIR HEATER FOR GASOLENE ENGINES.
APPLICATION FILED FEB. 23, 1915.

1,157,189.

Patented Oct. 19, 1915.

UNITED STATES PATENT OFFICE.

JOHN O. SNYDER, OF DAYTON, OHIO.

AIR-HEATER FOR GASOLENE-ENGINES.

1,157,189.

Specification of Letters Patent.

Patented Oct. 19, 1915.

Application filed February 23, 1915. Serial No. 9,811.

*To all whom it may concern:*

Be it known that I, JOHN O. SNYDER, a citizen of the United States, residing at Dayton, in the county of Montgomery and State of Ohio, have invented certain new and useful Improvements in Air-Heaters for Gasolene-Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for improving the efficiency of the explosive mixture for gas engines; more specifically speaking, to means for producing and introducing air at a suitable temperature at a point where it mixes with the gasolene vapor.

The object of the invention is to provide simple and efficient means whereby the heat due to the exhaust from the engine is utilized to heat the air and the air thus heated is caused to enter the intake manifold or carbureter and whereby the gasolene is mixed with air under most favorable conditions.

Figure 1:
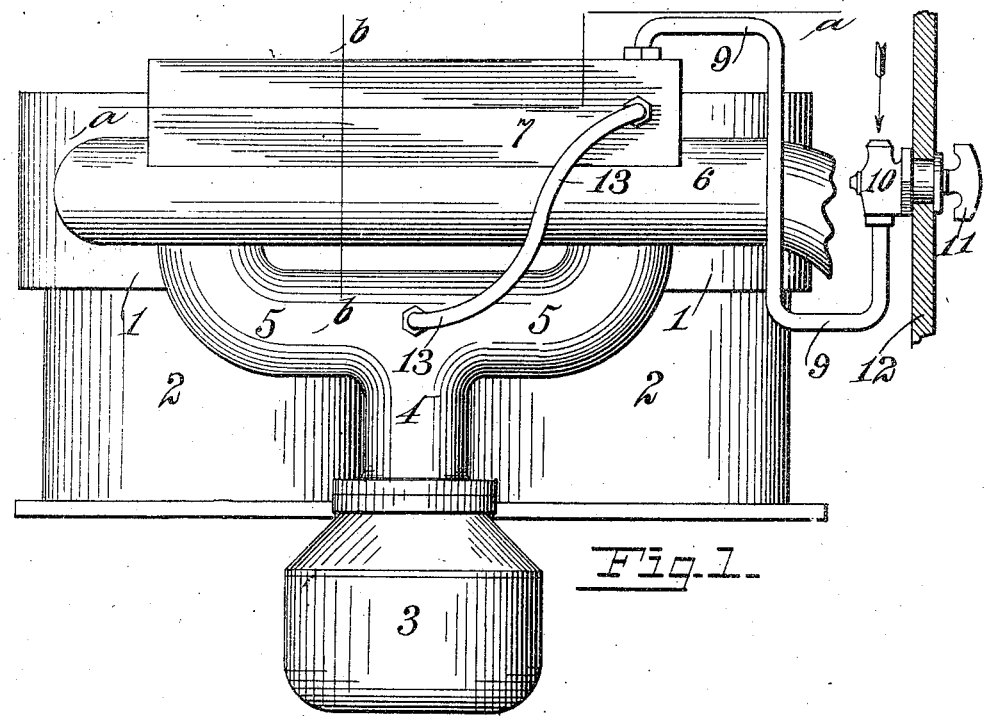
Figure 2:
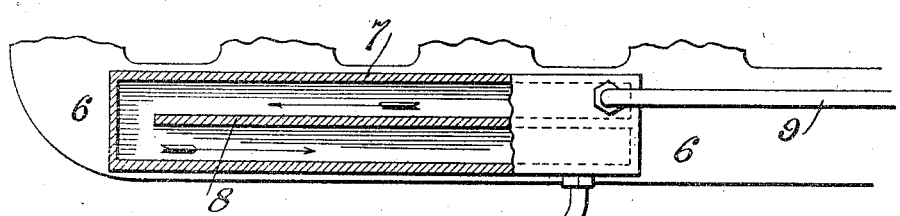
Figure 3:
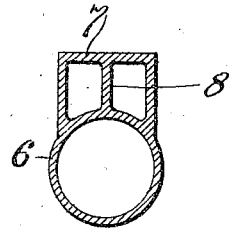

Referring to the accompanying drawings, which illustrate my invention, Figure 1 is a plan view showing the cylinders of an engine and other elements including the intake manifold and exhaust manifold and the carbureter with air pipe connections; Fig. 2 is a sectional view on the line *a—a* of Fig. 1; Fig. 3 is a sectional view on the line *b—b* of Fig. 1.

1 designates the heads forming the combustion chambers of explosive cylinders 2—2.

3 designates a carbureter which is connected with said heads and communicates with the combustion chambers in said heads through an intake manifold 4 branches 5—5 of which lead into said heads.

6 designates an exhaust manifold forming the outlet from the engine for the products of combustion.

7 designates an air box which is preferably integral with the exhaust manifold 6 though it may be independent thereof but attached thereto. It is preferable, however, as stated, that this air box shall be integral with the exhaust manifold so that but one wall may separate the two in order that the heat due to the exhaust will be transmitted readily to said air box. The interior of said air box is provided with one or more walls 8 which cause the air to circulate therein and to be thus trapped for a period and subjected to the heat before it passes into the intake manifold 4. Air is introduced into one end of said air box through a pipe 9 which leads to a valve 10. The valve 10 is mounted at a suitable point, the finger 11 thereof being in a convenient place to be manipulated by the hand. The valve 10 permits the amount of heated air passing to the carbureter to be adjusted to suit the various atmospheric conditions. As the valve 10 is located at the free end of the pipe 9, the said valve may be located in a position convenient to the operator who may adjust the air at a moment's notice and without inconvenience. Also the valve may be operated directly without the agency of intervening connections which are liable to become disconnected and otherwise interfere with the operation of the device. In the drawings I have shown the said valve mounted upon an element 12 which may be the dashboard of an automobile upon which the engine is mounted. The air introduced to the air box 7 is carried to the intake manifold 4 above the carbureter through a pipe 13. The said air box 7 is of an oblong character and is in contact with the substantial part of the exhaust manifold 6. This is desirable in order that the air entering said box will be raised to a high temperature quickly and will insure the heated condition of the air when it passes into the intake manifold. It is well known that air in a heated condition causes the gasolene to more thoroughly vaporize through expansion of the molecules thereof. The efficiency of the engine is enhanced through an increase of speed and a material saving in the consumption of gasolene is effected as well as a material lessening of the formation of carbon due so often to faulty combustion.

Having described my invention, I claim.

The combination with an intake and an exhaust manifold, of an air box mounted on said exhaust manifold and subject to the heat therefrom, an inlet pipe forming a communication between said air box and the atmosphere, a valve located at the free end of said pipe and controlling the passage of air to said box, said pipe permitting said valve to be located at a point convenient to the operator, and an outlet pipe connecting said air box with the intake manifold and through which heated air is discharged from the air box to said intake manifold.

In testimony whereof I affix my signature, in presence of two witnesses.

JOHN O. SNYDER.

Witnesses:
WILLIAM D. SNYDER,
R. J. MCCARTY.